(12) United States Patent
Ku et al.

(10) Patent No.: US 8,535,838 B2
(45) Date of Patent: Sep. 17, 2013

(54) POWER SUPPLY DEVICE

(75) Inventors: Jie-Ren Ku, Kaohsiung (TW); Chan-Li Hsueh, Qieding Shiang (TW); Ya-Yi Hsu, Guiren Shiang (TW); Fang-hei Tsau, Niaosong Shiang (TW); Reiko Ohara, Tainan (TW); Shing-Fen Tsai, Xinshi Shiang (TW); Chien-Chang Hung, Pingtung (TW); Ming-Shan Jeng, Xizhi (TW); Cheng-Yen Chen, Yongkang (TW)

(73) Assignee: Industrial Technology Research Institute, Hsinchu (TW)

( * ) Notice: Subject to any disclaimer, the term of this patent is extended or adjusted under 35 U.S.C. 154(b) by 307 days.

(21) Appl. No.: 12/847,585

(22) Filed: Jul. 30, 2010

(65) Prior Publication Data

US 2011/0143235 A1 Jun. 16, 2011

(30) Foreign Application Priority Data

Dec. 14, 2009 (TW) ................. 98142790 A

(51) Int. Cl.
*H01M 8/06* (2006.01)
(52) U.S. Cl.
USPC ........... 429/421; 429/408; 429/416; 429/490; 48/61
(58) Field of Classification Search
USPC ............. 429/17, 444, 421, 19, 408, 416, 426, 429/490, 512, 516; 205/338; 48/61; 427/392, 427/393; 428/290; 423/658.2
IPC ....................................................... H01M 8/06
See application file for complete search history.

(56) References Cited

U.S. PATENT DOCUMENTS

2005/0252023 A1 11/2005 Anthes et al.
2006/0170391 A1 8/2006 Lam

FOREIGN PATENT DOCUMENTS

| JP | 63184267 A | 7/1988 |
| JP | 08180895 | 7/1996 |
| JP | 08315845 | 11/1996 |
| JP | 2000003717 | 1/2000 |
| JP | 2002324564 | 11/2002 |
| JP | 2004139914 A | 5/2004 |
| JP | 2005310437 | 11/2005 |
| JP | 2006107916 | 4/2006 |
| JP | 2008546523 | 12/2008 |
| JP | 2009114012 | 5/2009 |
| JP | 2009283194 | 12/2009 |
| TW | I253773 | 4/2006 |
| TW | 255579 | 5/2006 |

OTHER PUBLICATIONS

CN Office Action dated Oct. 31, 2012.
JP Office Action dated Oct. 16, 2012.

(Continued)

*Primary Examiner* — Basia Ridley
*Assistant Examiner* — Heng Chan
(74) *Attorney, Agent, or Firm* — McClure, Qualey & Rodack, LLP

(57) ABSTRACT

A power supply device is provided. The power supply device includes a fuel cell, a hydrogen generator, a check valve and an exhaust valve. The fuel cell has a hydrogen inlet and a hydrogen outlet. The hydrogen generator is connected to the hydrogen inlet and used for generating hydrogen. The check valve is disposed in the hydrogen inlet and used for preventing the hydrogen within the fuel cell from flowing to the hydrogen generator, and preventing exterior air from entering the fuel cell. The exhaust valve is disposed in the hydrogen outlet for exhausting the hydrogen within the fuel cell.

23 Claims, 8 Drawing Sheets

(56) References Cited

OTHER PUBLICATIONS

English Abstract translation of JP2009114012 (Published May 28, 2009).
English Abstract translation of JP08180895 (Published Jul. 12, 1996).
English Abstract translation of JP2002324564 (Published Nov. 8, 2002).
English Abstract translation of JP2000003717 (Published Jan. 7, 2000).
English Abstract translation of JP2005310437 (Published Nov. 4, 2005).
English Abstract translation of JP2008546523 (Published Dec. 25, 2008).
English Abstract translation of JP2006107916 (Published Apr. 20, 2006).
Notice of Allowance issued by TW Intellectual Property Office on Nov. 29, 2012.
English Abstract translation of TWI253773 (Published Apr. 21, 2006).
English Abstract translation of JP63184267 (Published Jul. 29, 1988).
English Abstract translation of JP2004139914 (Published May 13, 2004).
English Abstract translation of JP08315845 (Published Nov. 29, 1996).
English language translation of abstract of TW 255579 (published May 21, 2006).
English language translation of abstract of JP 2009283194 (published Dec. 3, 2009).
Prosini, P.P., et al.; "A Hydrogen Refill for Cellular Phone;" Proceedings International Hydrogen Energy Congress and Exhibition; Jul. 2005; pp. 1-6.
Jeong, S.U., et al; "A Study on Hydrogen Generation from NaBH4 Solution Using the High-Performance Co-B Catalyst;" Journal of Power Sources; 2005; pp. 129-134.
Pending U.S. Appl. No. 12/476,894.
Pending U.S. Appl. No. 12/493,014, filing acknowledged.

POWER SUPPLY DEVICE

This application claims the benefit of Taiwan application Serial No. 98142790, filed Dec. 14, 2009, the subject matter of which is incorporated herein by reference.

BACKGROUND

1. Technical Field

The disclosure relates in general to a power supply device, and more particularly to a power supply device integrating fuel cell.

2. Description of the Related Art

The fuel cell is based on the theories of generating a chemical reaction of hydrogen and oxygen to obtain water and power, wherein hydrogen is used as an input material and oxygen is used as an oxidant.

The fuel cell includes a hydrogen outlet and a hydrogen inlet. The hydrogen outlet is connected to an atmospheric environment, and the hydrogen inlet is connected to a hydrogen source. The hydrogen, which has entered the fuel cell but not yet participated in reaction, is exhausted to the atmospheric environment from the hydrogen outlet. As a result, power generation efficiency of the fuel cell is not satisfactory, hydrogen is wasted, and the utilization rate cannot be increased.

SUMMARY

The disclosure is directed to a power supply device, which includes a fuel cell and two valves. The two valves are respectively disposed in the hydrogen inlet and the hydrogen outlet of the fuel cell for controlling the pressure in the fuel cell, increasing the power generation efficiency of the fuel cell, and preventing the air from entering the fuel cell, and prolonging the lifespan.

According to a first aspect of the present disclosure, a power supply device is provided. The power supply device includes a fuel cell, a hydrogen generator, a check valve and an exhaust valve. The fuel cell has a hydrogen inlet and a hydrogen outlet. The hydrogen generator is connected to the hydrogen inlet and used for generating hydrogen. The check valve is disposed in the hydrogen inlet and used for preventing the hydrogen within the fuel cell from flowing to the hydrogen generator, and preventing exterior air from entering the fuel cell. The exhaust valve is disposed in the hydrogen outlet for exhausting the hydrogen within the fuel cell.

The disclosure will become apparent from the following detailed description of the exemplary but non-limiting embodiments. The following description is made with reference to the accompanying drawings.

DETAILED DESCRIPTION

First Embodiment

Figure 1:
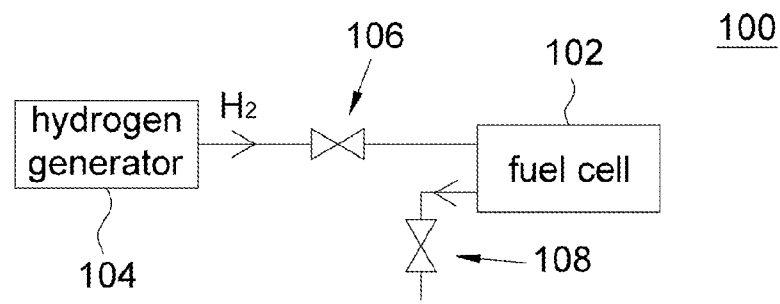
FIG. 1 shows a function block diagram of a power supply device according to first embodiment of the disclosure.

Referring to FIG. 1, a function block diagram of a power supply device according to a first embodiment of the disclosure is shown. The power supply device 100 includes a fuel cell 102, a hydrogen generator 104, a check valve 106 and an exhaust valve 108. The hydrogen generator 104 is used for generating hydrogen to enter the fuel cell 102.

The check valve 106 and the exhaust valve 108 control and stabilize the pressure of the hydrogen within the fuel cell 102, so that the fuel cell 102 generates power under the environment of a stable and sufficient hydrogen pressure, and fewer oxygen and impurities in the air would enter the fuel cell 102.

The power supply device 100 may be electrically connected to an electronic device (not illustrated) for supplying power to the electronic device. The electronic device may be realized by a portable communication device, a computer, a flashlight or other electronic devices. However, the present embodiment of the disclosure is not limited to the above exemplification. In another implementation, the power supply device 100 may be electrically connected to an electrical storage device, such as a lithium battery, for supplying power to the electrical storage device, so that the electrical storage device stores and provided the power to the electronic device.

The fuel cell 102 may be a proton exchange membrane (PEM) fuel cell or a fuel cell of other types. In the present embodiment of the disclosure, the fuel cell is exemplified by a PEM fuel cell.

Figure 2:
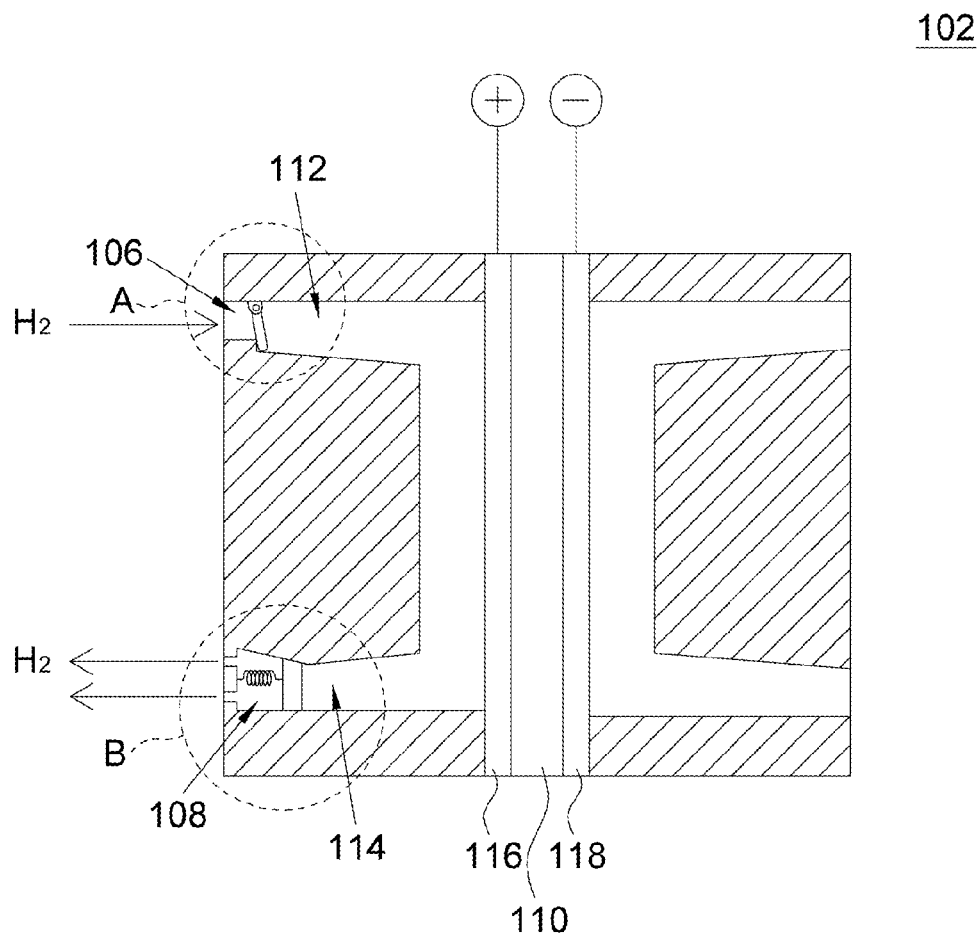
FIG. 2 shows a schematic diagram of the power supply device of FIG. 1.

Referring to FIG. 2, a schematic diagram of the power supply device of FIG. 1 is shown. The fuel cell 102 includes a PEM 110, a positive electrode 116, and a negative electrode 118, and further has a hydrogen inlet 112 and a hydrogen outlet 114.

A pipe (not illustrated) may be used for connecting the hydrogen inlet 112 and the hydrogen generator 104 for transferring the hydrogen generated by the hydrogen generator 104 to the fuel cell 102. The check valve 106 is disposed in the hydrogen inlet 112 and used for preventing the hydrogen within the fuel cell 102 from reflowing to the hydrogen generator 104. The exhaust valve 108 is disposed in the hydrogen outlet 114 for exhausting the hydrogen within the fuel cell 102.

In greater details, the check valve 106 prevents the hydrogen within the fuel cell 102 from flowing to the atmospheric environment, and has the function of accumulating hydrogen for boosting the pressure of the hydrogen within the fuel cell 102 to a predetermined pressure. When the pressure of the hydrogen within the fuel cell 102 reaches the predetermined pressure, the exhaust valve 108 is opened to exhaust extra hydrogen for keeping the pressure of the hydrogen within the fuel cell 102 in the predetermined pressure. The predetermined pressure may be a safe work pressure of the fuel cell 102 or a work pressure which increases power generation efficiency for the fuel cell 102. The detailed structures of the check valve 106 and the exhaust valve 108 are disclosed below.

Figure 3:
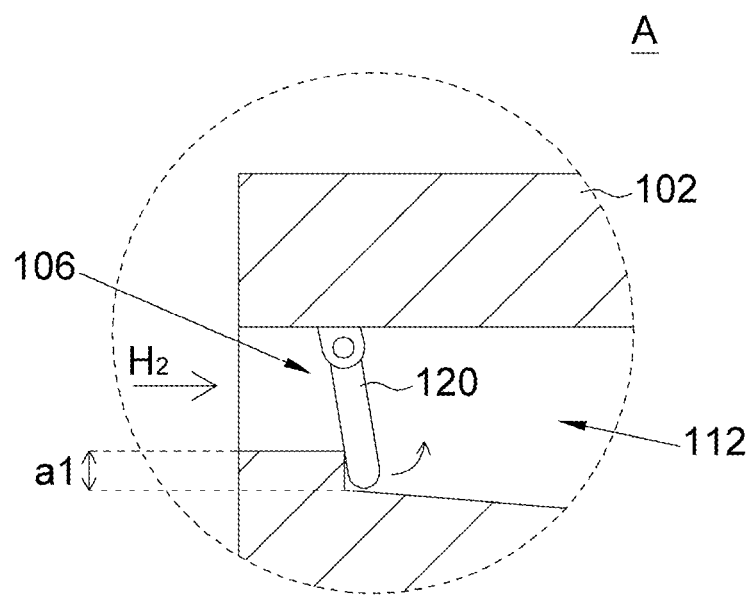
FIG. 3 shows a schematic diagram of a portion A of FIG. 2.

Referring to FIG. 3, a schematic diagram of a portion A of FIG. 2 is shown. The check valve 106 includes an intake valve 120 movably disposed in the fuel cell 102 by way of pivotal connection and selectively exposed from the hydrogen inlet 112 for allowing hydrogen to enter the fuel cell 102.

The inner wall of the hydrogen inlet 112 has a step structure a1, which stops the intake valve 120 when the hydrogen within the fuel cell 102 is to be exhausted from the hydrogen inlet 112, so that the hydrogen within the fuel cell 102 will not be exhausted from the hydrogen inlet 112. However, the check valve 106 of the present embodiment of the disclosure is not limited to the structure indicated in FIG. 3. In other implementations, the check valve 106 may be realized by a check valve or a direction control valve with other structures, and the present embodiment of the disclosure does not impose particular restriction regarding the structure of the check valve 106.

Figure 4:
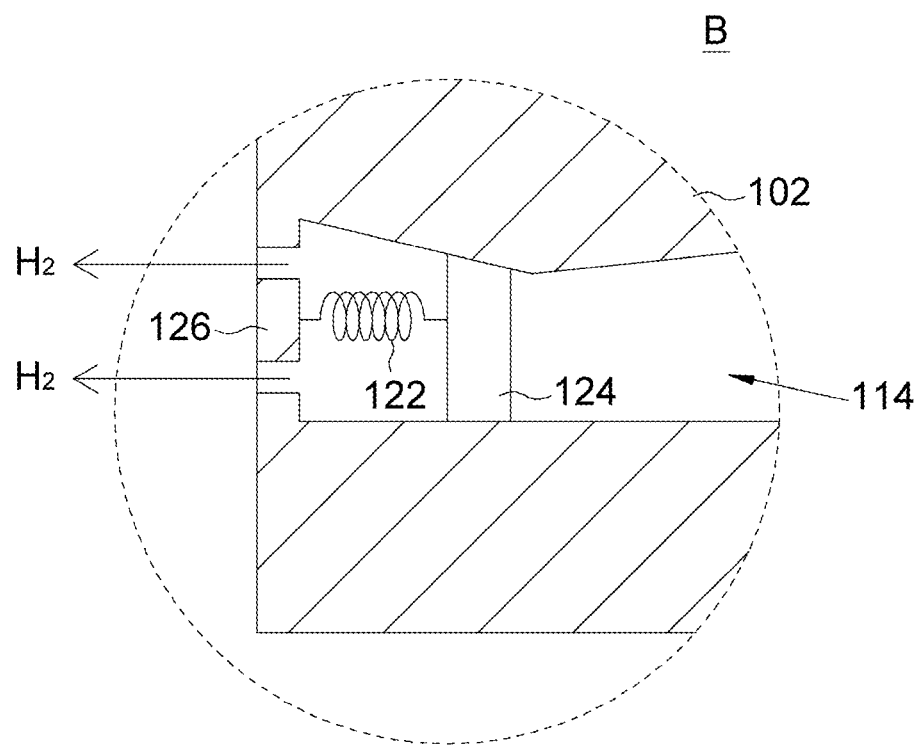
FIG. 4 shows a schematic diagram of a portion B of FIG. 2.

Referring to FIG. 4, a schematic diagram of a portion B of FIG. 2 is shown. The exhaust valve 108 includes an elastic member 122 and an exhaust valve 124. An end of the elastic member 122 is fixed on the inner wall 126 of the hydrogen outlet 114 of the fuel cell 102, wherein the elastic member 122 provides an elastic force for shielding the hydrogen outlet 114. The exhaust valve 124 is movably connected to another end of the elastic member 122. When the force applied on the exhaust valve 124 by the pressure of the hydrogen within the fuel cell 102 reaches the elastic force, the exhaust valve 124 is pushed and then opened to exhaust extra hydrogen from the fuel cell 102.

The exhaust valve 108 of the present embodiment of the disclosure is not limited to the structure indicated in FIG. 4. In other implementations, the exhaust valve 108 may have other types of structure. That is, the present embodiment of the disclosure does not impose particular restriction regarding the structure or the type of the exhaust valve 108. For example, in an implementation, the exhaust valve 108 may be realized by a kind of check valve used for preventing exterior air or impurities from entering the fuel cell 102. In another implementation, the exhaust valve 108 may be realized by a pressure control valve or a direction control valve.

Figure 5:
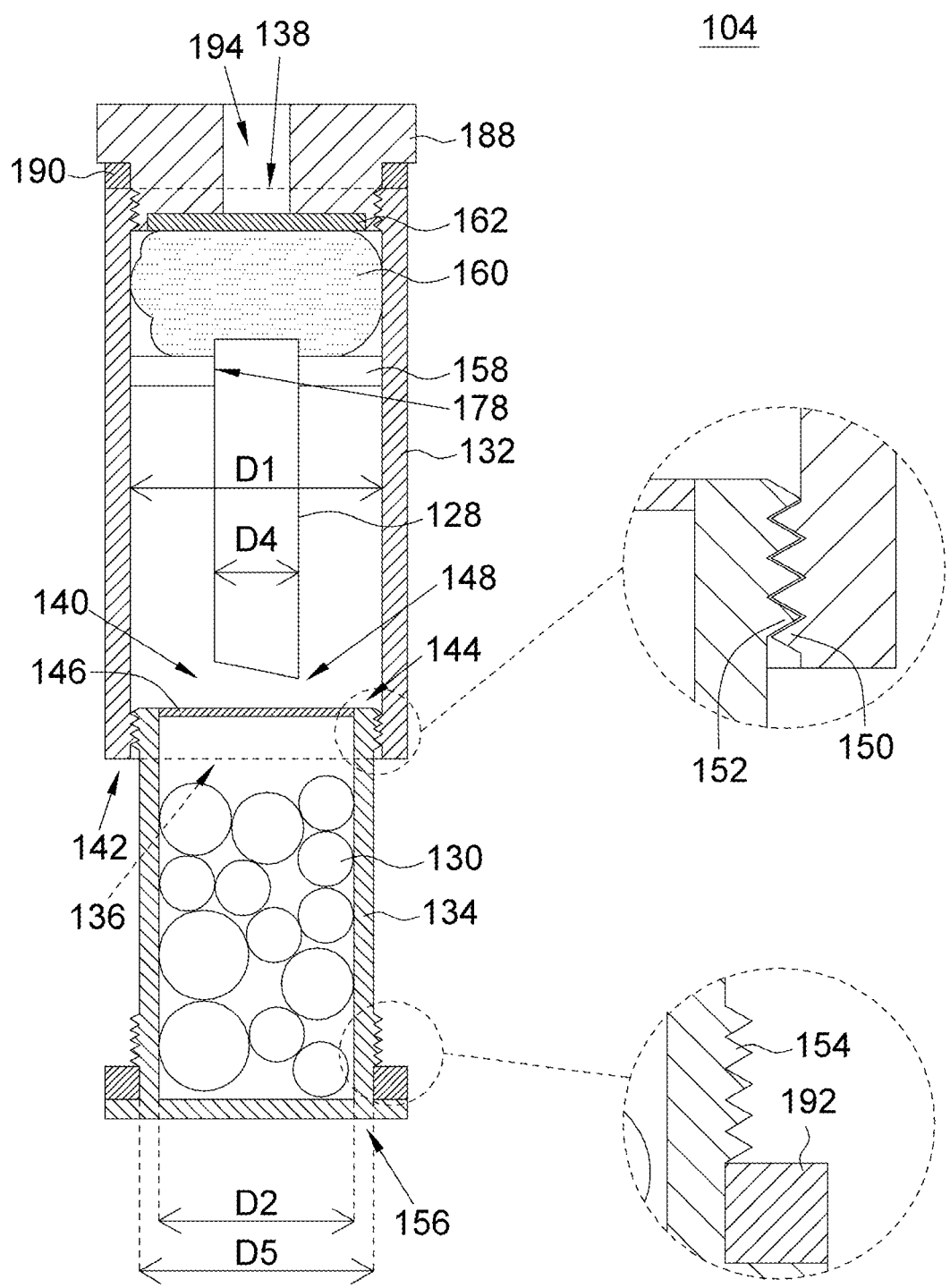
FIG. 5 shows a schematic diagram of hydrogen generator of FIG. 1.

The details of the hydrogen generator 104 of the present embodiment of the disclosure are disclosed below. Referring to FIG. 5, a schematic diagram of hydrogen generator of FIG. 1 is shown. The hydrogen generator 104 includes a first casing 132, a second casing 134, a solid hydrogen fuel 128 and an absorbent material 130. The absorbent material 130 carries water for performing hydrogen releasing reaction with the solid hydrogen fuel 128.

The solid hydrogen fuel 128 includes a hydride powder and a catalyst powder, wherein the hydride powder may be realized by sodium borohydride (NaBH4), and the catalyst powder may be realized by a plurality of metal nano particles. The metal nano particles are nano particles of at least one or more than one metal selected from the group composed of ruthenium (Ru), cobalt (Co), nickel (Ni), iron (Fe), manganese (Mn) and copper (Cu). An average particle size of the catalyst powder ranges between 1 μm-10 mm.

In an implementation, the catalyst powder includes a plurality of catalyst carriers and the abovementioned metal nano particles. The metal nano particles may be spread on the surface of the catalyst carriers. In another implementation, the catalyst powder includes a plurality of catalyst carriers and metal ions, and the metal ions may be chelated on the surface of the catalyst carriers.

As indicated in FIG. 5, the first casing 132 may be a pipe with hollow portion, and the solid hydrogen fuel 128 is disposed in the first casing 132. The first casing 132 has a first opening 136 and a third opening 138. The first opening 136 is located at an end 142 of the first casing 132, and the third opening 138 may be connected to the hydrogen inlet 112 through a pipe (not illustrated).

The second casing 134 may be a pipe with hollow portion. The absorbent material 130 is disposed in the second casing 134. The second casing 134 has a second opening 140. The second opening 140 is located at an end 144 of the second casing 134, and the end 142 of the first casing 132 is connected to the end 144 of the second casing 134.

The first casing 132 and the second casing 134 may be pen-shaped or slim and lightweighted, has excellent portability and provides great convenience.

As indicated in FIG. 5, the inner diameter D2 of the second opening 140 is larger than the outer diameter D4 of the solid hydrogen fuel 128, and the outer diameter D5 of the second casing 134 is smaller than the inner diameter D1 of the first opening 136, so that after the second casing 134 enters the first casing 132 through the first opening 136, the absorbent material 130 and the solid hydrogen fuel 128 come into contact for performing hydrogen releasing reaction, and the generated hydrogen flows to the fuel cell 102 through the third opening 138.

The "outer diameter" refers to the diameter measured from the outer side of an element, the "inner diameter" refers to the diameter of the inner side measured from an element, and the diameters are not limited to the inner diameter or the outer diameter of a circular cross-section.

The hydrogen generator 104 further includes a cover 188, a water absorbent member 160, a gas-liquid separating film 162 and a first sealing member 190. The cover 188 is detachably connected to the first casing 132. For example, the cover 188 is detachably connected to the first casing 132 by way of screw thread locking or press fit. The cover 188 may have a channel 194, which is connected to the third opening 138.

The gas-liquid separating film 162 is disposed on the cover 188, and the water absorbent member 160 is disposed in the first casing 132, wherein the water absorbent member 160 and the gas-liquid separating film 162 are located between the third opening 138 and the solid hydrogen fuel 128.

The water absorbent member 160, realized by cotton, sponge or a Phenol-Formaldehyde(PF), may be disposed in the first casing 132 for absorbing and preventing the water not participating in reaction from flowing to the fuel cell 102. Preferably but not restrictively, the water absorbent member 160 shields the entire third opening 138.

The gas-liquid separating film 162 may stop the water not participating in reaction, and only allows hydrogen to pass through. Preferably but not restrictively, the gas-liquid separating film 162 shields the entire third opening 138.

In an implementation, if the absorbent material 130 and the solid hydrogen fuel are fully reacted or the water not participating in reaction has a small volume, the water absorbent member 160 and the gas-liquid separating film 162 may be omitted. The small volume of the water not participating in reaction will be sucked on the wall of the first casing 132 and the second casing 134. Therefore, despite the water absorbent member 160 and the gas-liquid separating film 162 are omitted, no water will be discharged to the exterior or leaked from the third opening 138.

The first sealing member 190, such as an elastic O-shaped ring, is disposed on the cover 188. When the cover 188 is locked on the first casing 132, the first sealing member 190 is squeezed between the cover 188 and the first casing 132 so as to generate sealing effect and avoid the water not participating in reaction being leaked from the third opening 138.

Figure 6:
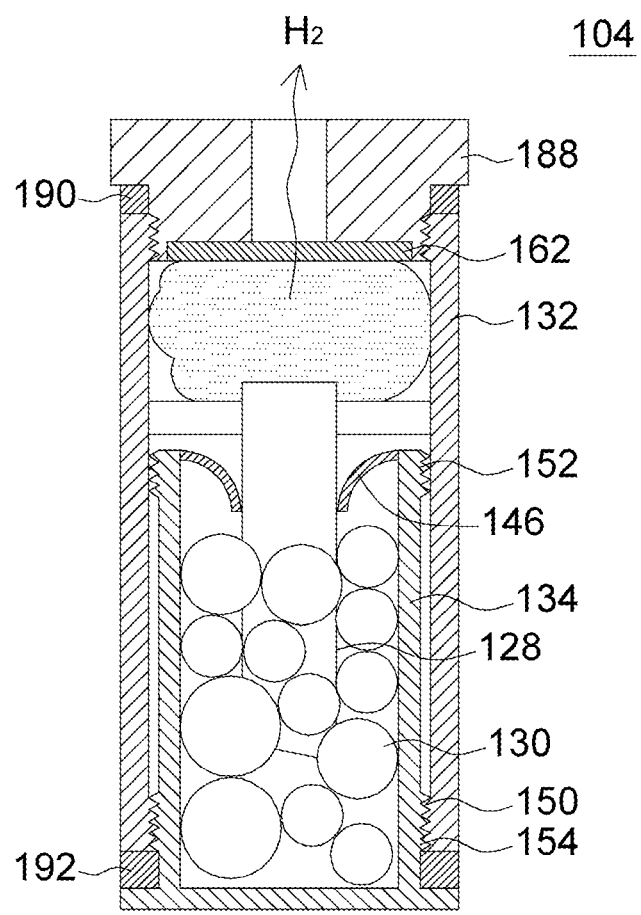
FIG. 6 shows a schematic diagram of a solid hydrogen fuel of FIG. 5 contacting an absorbent material.

The second casing 134 includes a second sealing member 192 and a membrane 146. The membrane 146 shields the second opening 140 for preventing the absorbent material 130 from coming off the second opening 140. The solid hydrogen fuel 128 has a tip 148 disposed at an end of the solid hydrogen fuel 128 towards the membrane 146 for puncturing the membrane 146. When the second casing 134 enters the first casing 132, the solid hydrogen fuel 128 will puncture the membrane 146, so that the solid hydrogen fuel 128 and the absorbent material 130 come into contact. As indicated in FIG. 6, a schematic diagram of a solid hydrogen fuel of FIG. 5 contacting an absorbent material is shown.

The second sealing member 192, such as an elastic O-shaped ring, is disposed at another end 156 of the second casing 134. When the second casing 134 enters the first casing 132, the second sealing member 192 is squeezed between the second casing 134 and the first casing 132 for generating sealing effect and preventing the water not participating in reaction from being leaked to the exterior.

The first casing 132 further includes a first connection portion 150, disposed at the end 142 of the first casing 132. The second casing 134 further includes a second connection portion 152 and a third connection portion 154. The second connection portion 152 is disposed at the end 144 of the second casing 134, and the third connection portion 154 is disposed at the other end 156 of the second casing 134.

In the present embodiment of the disclosure, the first connection portion 150 and the second connection portion 152 are mutually matching screw threads, and the first connection portion 150 and the third connection portion 154 are mutually matching screw threads.

The second connection portion 152 selectively is connected to the first connection portion 150 or the third connection portion 154. Furthermore, before the second casing 134 enters the first casing 132, the first connection portion 150 is connected to the second connection portion 152, and after the second casing 134 enters the first casing 132, the first connection portion 150 is connected to the third connection portion 154. Furthermore, when the user would like to use the hydrogen generator 104, the first casing 132 or the second casing 134 of FIG. 5 may be rotated so that the second casing 134 enters the first casing 132 as indicated in FIG. 6. When the user is not using the hydrogen generator 104, the first casing 132 of FIG. 6 may be rotated, so that the solid hydrogen fuel 128 and the absorbent material 130 are separated as indicated in FIG. 5. The first casing 132 and the second casing 134 may be firmly connected together through the first connection portion 150, the second connection portion 152 and the third connection portion 154.

Referring to FIG. 5, the first casing 132 further includes a fixing portion 158 disposed between the inner wall and the solid hydrogen fuel 128 of the first casing 132 for fixing the solid hydrogen fuel 128. The fixing portion 158, fixed on the inner wall of the first casing 132, may have an engaging portion 178, such as a through hole, in which the solid hydrogen fuel 128 is engaged.

The details of the structure of the solid hydrogen fuel 128 are disclosed below.

Figure 7:
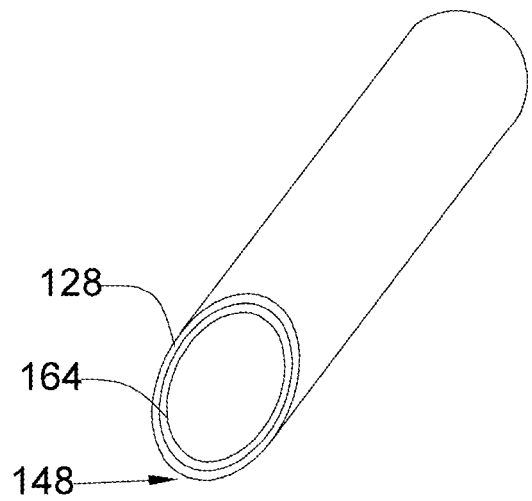
FIG. 7 shows a schematic diagram of the solid hydrogen fuel of FIG. 5.

Referring to FIG. 7, a schematic diagram of the solid hydrogen fuel of FIG. 5 is shown. The hydrogen generator 104 further includes a carrier 16 on which the solid hydrogen fuel 128 is disposed. The carrier 164 may be in the shape of a hollow cylinder, and the solid hydrogen fuel 128 may be attached on the outer surface of the carrier 164. However, the present embodiment of the disclosure is not limited to the above exemplification. In an implementation, the solid hydrogen fuel 128 may be attached on both the inner and the outer surface of the carrier 164, or only on the inner surface of the carrier 164. However, the present embodiment of the disclosure is not limited to the above exemplification. In another implementation, the solid hydrogen fuel 128 does not have to be formed on the carrier 164.

The carrier 164 is a hollow carrier which provides larger surface area so that more solid hydrogen fuel 128 may be disposed on the carrier 164. As a result, the response rate of hydrogen releasing reaction by the solid hydrogen fuel 128 and water may be increased.

In an implementation, the carrier may be in the shape of a flat board or other appearances. The shape of carrier may match the shapes of the first casing 132 and the second casing 134, and the present embodiment of the disclosure does not impose any particular restriction.

The carrier 164, being flexible and porous carrier, may be formed by a metal. For example, the carrier 164 may be realized by a Ni-foam mesh, a nickel mesh, an iron-wire mesh or a copper-wire mesh. Due to the carrier 164 being flexible, the carrier 164 may be rolled up as a hollow cylinder as indicated in FIG. 7.

The porous carrier 164 may absorb the solid hydrogen fuel 128 into the pores, so that the solid hydrogen fuel 128 may be coated on the carrier 164. However, such exemplification is not for limiting the present embodiment of the disclosure, and the solid hydrogen fuel 128 may be formed on the carrier 164 by other ways such as by way of spraying or soaking.

Referring to FIG. 5, the absorbent material 130 includes a water absorbent body and water. The water absorbent body may be formed by high polymers or a combination of macromolecules and a cotton material. Examples of the material of the water absorbent body include polyacrylate, polyvinyl alcohol (PVA), Ethylene Vinyl Acetate (EVA), polyurethane, polyethylene oxide, starch graft copolymers, or rubber blends. Preferably but not restrictively, the water absorption rate of the absorbent material 130 ranges from 1:10 to 1:40, so as to obtain preferred hydrogen releasing reaction. The water absorption rate 1:10 means 1 gram of water absorbent body may absorb 10 grams of water. Moreover, the absorbent material 130 may be grain-shaped, and preferably but not restrictively, each grain of the absorbent material 130 is substantially of the same size.

Second Embodiment

Figure 8:
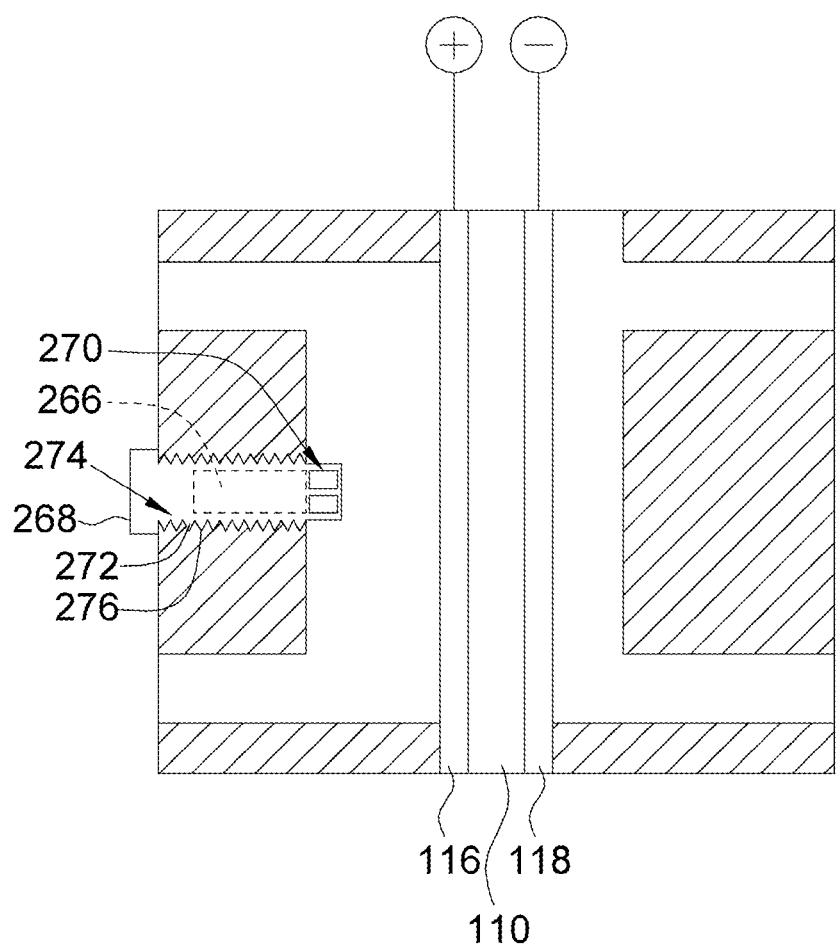
FIG. 8 shows a schematic diagram of a fuel cell according to second embodiment of the disclosure.

Referring to FIG. 8, a schematic diagram of a fuel cell according to a second embodiment of the disclosure is shown. As for the similarities between the second embodiment and the first embodiment, the same designations are used and the similarities are not repeated here. The fuel cell 202 of the second embodiment is different from the fuel cell 102 of the first embodiment in that: the fuel cell 202 further includes a deoxidizer 266 which absorbs the oxygen not participiating in reaction to avoid oxygen reacting with hydrogen so that the generated will not be as much as to burn down the PEM 110.

The fuel cell 202 further includes a deoxidizing member 268 and has a first through hole 274 and a fourth connection portion 276. The first through hole 274 passes through the thick wall of the fuel cell 202 and connects the interior of the fuel cell 202 to the exterior. The fourth connection portion 276 may be realized by the screw thread located on the inner wall surface of the first through hole 274.

The deoxidizing member 268 has a hollow portion (not illustrated), a second through hole 270 and a fifth connection portion 272. The second through hole 270 penetrates to the hollow portion from the outer wall surface (not designated) of the deoxidizing member 268. The fifth connection portion 272 may be realized by the screw thread which matches the fourth connection portion 276 and is located on the outer wall surface of the deoxidizing member 268 for connecting the fourth connection portion 276. The deoxidizer 266 is disposed in the hollow portion, and the oxygen, entering the deoxidizing member 268 through the second through hole 270, is absorbed by the deoxidizer 266. In an implementation, the shapes of the fourth connection portion 276 and the fifth connection portion 272 may be in the shape of mutual matching cones for producing sealing effect when the fourth connection portion 276 and the fifth connection portion 272 are connected together, and the deoxidizing member 268 may also become a removable deoxidizing member.

The deoxidizing member 268 being detachable makes it easier for the user to replace the deoxidizer 266. Preferably, the deoxidizing member 268 further includes a lid (not illustrated), and the deoxidizer 266 located in the hollow portion may be easily replaced when the lid is lifted.

In the present embodiment of the disclosure, the deoxidizer 266 of the fuel cell 202 is located in the deoxidizing member 268 for exemplification. However, the disclosure is not limited to the above exemplification. In an implementation, the fuel cell may do without the deoxidizing member 268, the first through hole 274 and the fourth connection portion 276, and the deoxidizer 266 may be disposed in the fuel cell 202, such as the inner wall the hydrogen inlet 112 or the hydrogen outlet 114, by way of pasting or locking. After the hydrogen generator 104 is activated, the oxygen exhausted from the hydrogen generator 104 and the fuel cell 202 will be absorbed, and the lifespan may thus be prolonged.

Moreover, in other implementations, the deoxidizer 266 may also be disposed in the hydrogen generator 104 such as in the outlet channel 194.

Third Embodiment

Figure 9:
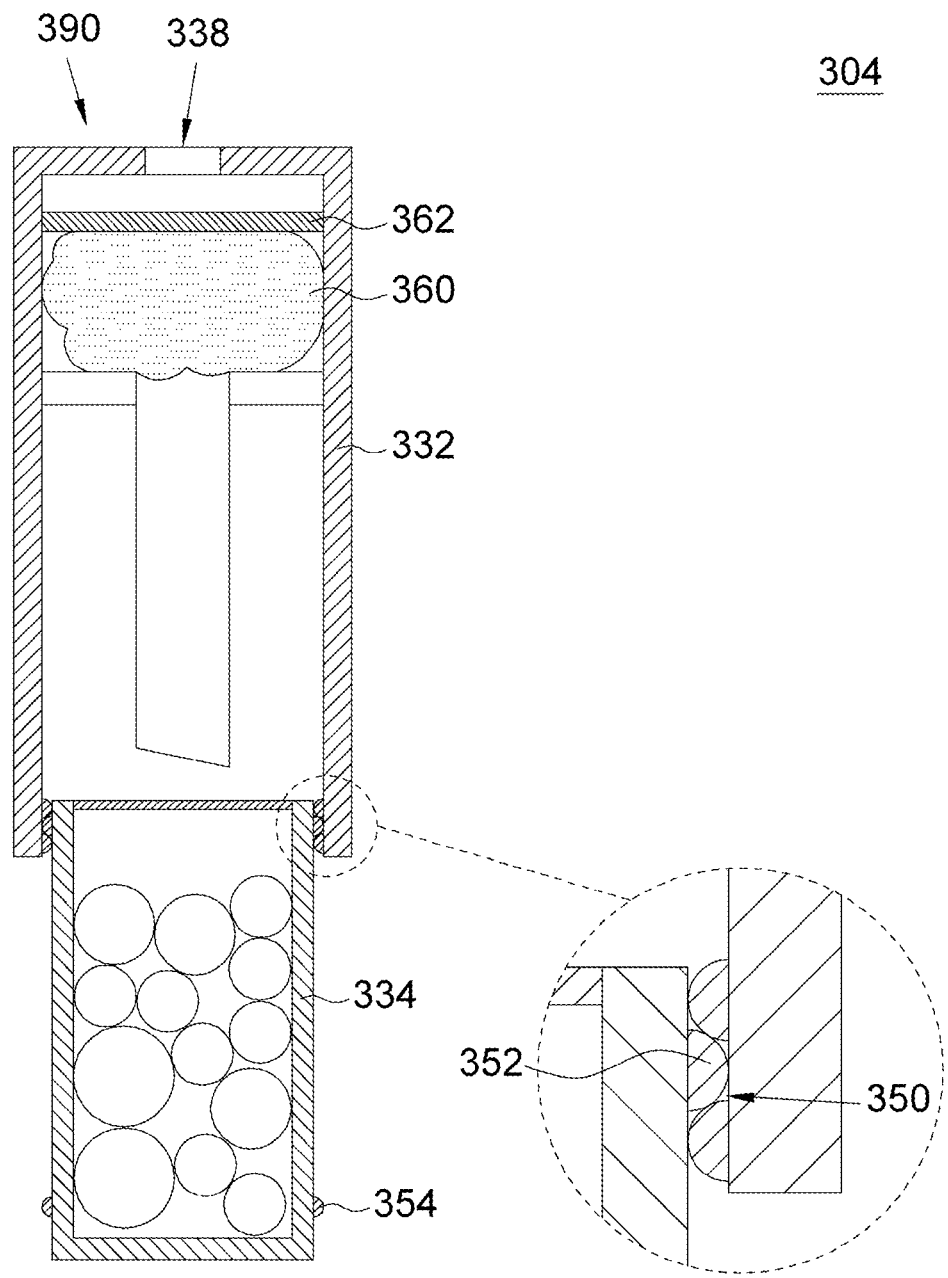
FIG. 9 shows a schematic diagram of hydrogen generator according to third embodiment of the disclosure.

Referring to FIG. 9, a schematic diagram of hydrogen generator according to a third embodiment of the disclosure is shown. As for the similarities between the third embodiment and the first embodiment, the same designations are used and the similarities are not repeated here. The hydrogen generator 304 of third embodiment is different the hydrogen generator 104 of the first embodiment in that: the connection portion of the hydrogen generator 304 is a protrusion or an indentation.

The first connection portion 350 is realized by an indentation disposed in the first casing 332. The second connection portion 352 and the third connection portion 354 are realized by a protrusion projected from the second casing 334 for engaging the first connection portion 350 as indicated in FIG. 9. However, the present embodiment of the disclosure is not limited to the above exemplification. In another implementation, the first connection portion 350 may be realized by a protrusion, and the second connection portion 352 and the third connection portion 354 may be realized by an indentation.

Alternatively, the hydrogen generator 304 of the present embodiment of the disclosure may do without the cover, and the third opening 338 may be disposed at another end 390 of the first casing 332 for connecting the hydrogen inlet.

The water absorbent member 360 and the gas-liquid separating film 362 are similar to the water absorbent member 160 and the gas-liquid separating film 162 of the first embodiment, and the similarities are not repeated here.

Figure 10:
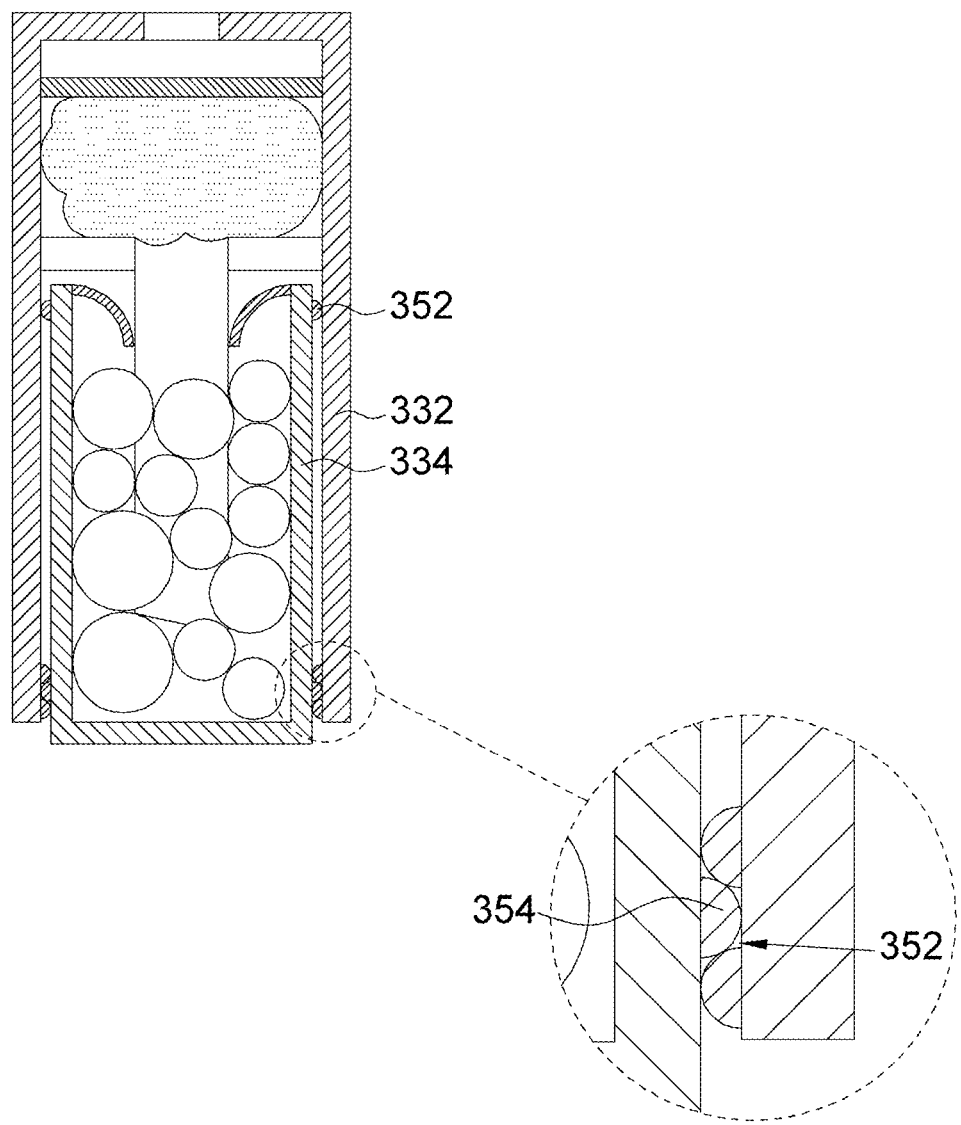
FIG. 10 shows a schematic diagram of a third connection portion of FIG. 9 engaged in the first connection portion.

It is noted that the water absorbent member 360 and the gas-liquid separating film 362 avoid the water not participating in reaction being leaked from the third opening 338, and the second connection portion 352 is engaged with the first connection portion 350 for avoiding objects entering the hydrogen generator 304. In addition, after the second casing 334 enters the first casing 332, the third connection portion 354 may be engaged with the first connection portion 350 for producing sealing effect, so that the water not participating in reaction will not be leaked. As indicated in FIG. 10, a schematic diagram of a third connection portion of FIG. 9 engaged in the first connection portion is shown.

The sizes of the second connection portion 352 and the third connection portion 354 may be slightly larger than that of the first connection portion 350, so that the second connection portion 352 and the third connection portion 354 are tightly engaged in the first connection portion 350, and the hydrogen generator 304 is sealed more tightly.

Moreover, the second connection portion 352 and the third connection portion 354 may be made from an elastic material, such as rubber or silicone, which enables the second connection portion 352 and the third connection portion 354 to be engaged with the first connection portion 350 when being pressed.

In the first embodiment to the third embodiment, hydrogen generation is exemplified by way of mixing the solid hydrogen fuel with the absorbent material. However, the absorbent material may also be replaced by a liquid, and such substitution is disclosed in the fourth embodiment below.

Fourth Embodiment

Figure 11:
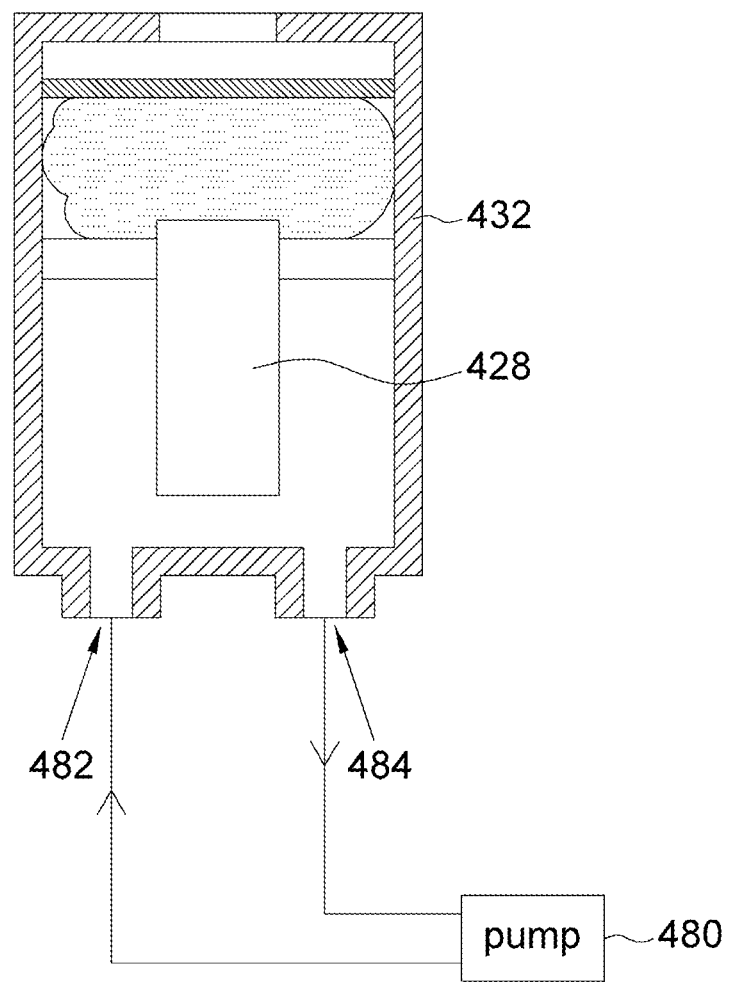
FIG. 11 shows a schematic diagram of hydrogen generator according to fourth embodiment of the disclosure.

Referring to FIG. 11, a schematic diagram of hydrogen generator according to a fourth embodiment of the disclosure is shown. As for the similarities between the fourth embodiment and the first embodiment, the same designations are used and the similarities are not repeated here. The hydrogen generator 404 of the fourth embodiment is different the hydrogen generator 104 of the first embodiment in that: the hydrogen generator 404 may do without the absorbent material.

The hydrogen generator 404 includes a first casing 432, a pump 480 and a solid hydrogen fuel 428.

The first casing 432 has a water inlet 482, a water outlet 484 and a third opening 486 connected to the hydrogen inlet 112.

The solid hydrogen fuel 428 is disposed in the first casing 432. The solid hydrogen fuel 428 and the liquid are used for performing hydrogen releasing reaction.

The pump 480 is connected to the water inlet 482 and the water outlet 484 for pumping the liquid into or drawing the liquid from the first casing 432. Furthermore, when the user would like to use the hydrogen generator 404, the user may activate the water supplying function of the pump 480 for pumping the liquid into the first casing 432. When the user does not use the hydrogen generator 404, the user may activate the water drawing function of the pump 480 to drawing the liquid from the first casing 432.

In the first to the fourth embodiment, hydrogen generation is performed by way of mixing the solid hydrogen fuel with an absorbent material or a liquid. However, the disclosure is not limited to the above exemplification. In other implementations, the hydrogen generator may be a hydrogen generation facility of other types such as a high-pressure steel bottle containing hydrogen, a hydrogen generation device using metal hydrogen releasing reaction technology, or other hydrogen generation devices using chemical technologies.

According to the power supply device disclosed in the above embodiments of the disclosure, two valves are respectively disposed the hydrogen inlet and the hydrogen outlet of the fuel cell for controlling the interior pressure of the fuel cell, hence increasing the power generation efficiency of the fuel cell.

While the disclosure has been described by way of example and in terms of an embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply device, comprising:
   a fuel cell having a hydrogen inlet and a hydrogen outlet;
   a hydrogen generator connected to the hydrogen inlet and used for generating hydrogen to enter the fuel cell, wherein the hydrogen generator comprises:
   a solid hydrogen fuel;
   an absorbent material carrying water for performing hydrogen releasing reaction with the solid hydrogen fuel;
   a first casing having a first opening and a third opening, wherein the third opening is for connecting the hydrogen inlet, and the solid hydrogen fuel is disposed in the first casing; and
   a second casing having a second opening, wherein the absorbent material is disposed in the second casing, the inner diameter of the second opening is larger than the outer diameter of the solid hydrogen fuel, and the outer diameter of the second casing is smaller than the inner diameter of the first opening, so that after the second casing enters the first casing through the first opening, the absorbent material and the solid hydrogen fuel come into contact for generating hydrogen;
   a check valve disposed in the hydrogen inlet for avoiding the hydrogen within the fuel cell from being exhausted from the hydrogen inlet; and
   an exhaust valve disposed in the hydrogen outlet for exhausting the hydrogen within the fuel cell.

2. The power supply device according to claim 1, wherein the exhaust valve is another check valve used for preventing exterior air from entering the fuel cell.

3. The power supply device according to claim 1, wherein the exhaust valve is a pressure control valve, which is opened for exhausting the hydrogen within the fuel cell when the pressure of the hydrogen within the fuel cell reaches a predetermined pressure.

4. The power supply device according to claim 1, wherein the exhaust valve comprises:
   an elastic member for providing an elastic force, wherein an end of the elastic member is fixedly disposed in the fuel cell; and
   an exhaust valve movably connected to another end of the elastic member;
   wherein, the exhaust valve is pushed and opened for exhausting the hydrogen within the fuel cell when the force of the hydrogen within the fuel cell reaches the elastic force.

5. The power supply device according to claim 1, wherein the check valve comprises:
   an intake valve movably disposed in the fuel cell and selectively exposed from the hydrogen inlet for allowing the hydrogen to enter the fuel cell.

6. The power supply device according to claim 1, wherein the first opening is located at an end of the first casing, the second opening is located at an end of the second casing, the first casing is connected to the second casing, and the second casing comprises a membrane shielding the second opening;
   wherein, the solid hydrogen fuel punctures the membrane when the second casing enters the first casing.

7. The power supply device according to claim 6, wherein the solid hydrogen fuel has a tip disposed at an end of the solid hydrogen fuel towards the membrane for puncturing the membrane.

8. The power supply device according to claim 6, wherein the first casing comprises a first connection portion disposed at the end of the first casing, and the second casing comprises a second connection portion disposed at the end of the second casing for connecting the first connection portion.

9. The power supply device according to claim 8, wherein the second casing further comprises a third connection portion for connecting the second connection portion after the second casing enters the first casing.

10. The power supply device according to claim 8, wherein one of the first connection portion and the second connection portion is a protrusion, the other of the first connection portion and the second connection portion is an indentation, and the protrusion is used for engaging with the indentation.

11. The power supply device according to claim 8, wherein the first connection portion has a first screw thread and the second connection portion has a second screw thread matching with the first screw thread.

12. The power supply device according to claim 1, wherein the first casing further comprises:
   a fixing portion disposed between the inner wall of the first casing and the solid hydrogen fuel for fixing the solid hydrogen fuel.

13. The power supply device according to claim 1, wherein the hydrogen generator further comprises a water absorbent member disposed between the third opening and the solid hydrogen fuel.

14. The power supply device according to claim 13, wherein the water absorbent member is formed by cotton, sponge or a Phenol-Formaldehyde(PF).

15. The power supply device according to claim 1, wherein the hydrogen generator further comprises a gas-liquid separating film disposed between the third opening and the solid hydrogen fuel.

16. The power supply device according to claim 15, wherein the hydrogen generator further comprises a cover which is detachably connected to the first casing and has a channel for connecting the third opening.

17. The power supply device according to claim 1, wherein the hydrogen generator further comprises:
   a carrier on which the solid hydrogen fuel is disposed.

18. The power supply device according to claim 17, wherein the carrier is a hollow cylinder or a flat board.

19. The power supply device according to claim 17, wherein the carrier is a porous carrier.

20. The power supply device according to claim 19, wherein the carrier is a metal mesh.

21. The power supply device according to claim 20, wherein the carrier is a Ni-foam mesh, a nickel mesh, an iron-wire mesh or a copper-wire mesh.

22. The power supply device according to claim 1, wherein the absorbent material comprises a water absorbent body and water;
   wherein, the water absorbent body comprises polyacrylate, polyvinyl alcohol (PVA), Ethylene Vinyl Acetate (EVA), polyurethane, polyethylene oxide, starch graft copolymers, or rubber blends.

23. The power supply device according to claim 22, wherein the water absorption rate of the water absorbent material ranges from 1: 10 to 1: 40.

* * * * *